United States Patent [19]

Nagata

[11] Patent Number: 4,729,539

[45] Date of Patent: Mar. 8, 1988

[54] SEAT SUSPENSION DEVICE

[75] Inventor: Shojiro Nagata, Akishima, Japan

[73] Assignee: Tachi S Co. Ltd., Tokyo, Japan

[21] Appl. No.: 882,142

[22] Filed: Jul. 3, 1986

[51] Int. Cl.⁴ .............................................. F16M 13/00
[52] U.S. Cl. ...................................... 248/575; 108/136;
 248/421; 248/588; 248/608; 297/347
[58] Field of Search ................ 297/347, 339; 248/421,
 248/608, 561, 587, 588, 595, 575, 590, 584;
 108/136; 267/154, 131

[56] References Cited

U.S. PATENT DOCUMENTS

| | | | |
|---|---|---|---|
| 3,140,851 | 7/1964 | Bilancia | 248/608 X |
| 3,358,659 | 12/1967 | Renger | 267/154 X |
| 3,756,552 | 9/1973 | Wilhelms et al. | 248/575 X |
| 3,813,073 | 5/1974 | Mohr et al. | 248/608 |
| 4,093,197 | 6/1978 | Carter et al. | 267/131 |
| 4,438,978 | 3/1984 | Arild | 248/608 X |
| 4,573,657 | 3/1986 | Sakamoto | 248/588 X |
| 4,616,799 | 10/1986 | Rebentisch | 248/608 X |

FOREIGN PATENT DOCUMENTS

| | | |
|---|---|---|
| 131432 | 10/1981 | Japan . |
| 151837 | 10/1984 | Japan . |
| 678021 | 8/1952 | United Kingdom ................ 267/154 |

Primary Examiner—J. Franklin Foss
Assistant Examiner—David L. Talbott
Attorney, Agent, or Firm—Oldham, Oldham & Weber Co.

[57] ABSTRACT

A seat suspension device for use in an automotive seat which comprises a pair of right and left X-shaped links for connecting a lower frame with an upper frame and a torsion bar journaled to the pivotally-connected portions of the two X-shaped links. The torsion bar includes two ends, with one end thereof being engaged with one of the X-shaped links and the other end engaged with the other X-shaped link, so that the upper frame can be supported resiliently relative to the lower frame.

7 Claims, 10 Drawing Figures

SEAT SUSPENSION DEVICE

BACKGROUND OF THE INVENTION

1. Field of the Invention

The present invention relates to a seat suspension device for use in a seat for an automobile or the like.

2. Description of the Prior Art

Conventionally, an automobile is provided with a seat suspension device which is interposed between the seat and the floor surface of the automobile to resiliently support the seat so as to absorb vibrations and shocks produced when the automobile is travelling along bad roads or the like.

As seat suspension devices of this type, conventionally, for example, there are known two suspension devices which are respectively disclosed in Japanese Utility Model Publication No. 151837 of 1984 and Japanese Patent Publication No. 131432 of 1981.

In other words, in the above-mentioned seat support devices, an upper frame is supported such that it can be moved through an X-shaped link in the vertical direction relative to a lower frame, and a coil spring is interposed between the X-shaped link and a frame, whereby the suspension operation thereof is performed by means of the compressing and resiling forces of the coil spring.

However, either of these conventional seat suspension devices employs a coil spring having a large diameter, with the result that the whole seat suspension device is large in weight. Also, when such coil spring is provided within the frame, the frame is great in thickness and, when such coil spring is interposed between the frame and the X-shaped link, there requires a large space between the frames, with the result that the whole seat suspension device becomes large in thickness. Therefore, the above-mentioned prior art seat suspension devices are found disadvantageous in that they are hard to apply to an automobile which is limited in the room space thereof.

SUMMARY OF THE INVENTION

The present invention aims at eliminating the drawbacks found in the above-mentioned prior art seat suspension devices.

Accordingly, it is an object of the invention to provide a lighter weight seat suspension device.

To attain this object, according to the invention, a torsion bar is employed as resilient means to thereby provide a seat suspension device which is reduced in weight over the conventional seat suspension devices employing a coil spring as resilient means.

It is another object of the invention to provide a seat suspension device which is reduced in thickness as a whole by use of thinner upper and lower frames.

In achieving this object, according to the invention, a torsion bar is journaled by the pivotally-mounted portions of a pair of right and left X-shaped links for connecting the upper and lower frames to each other, which eliminates the need for provision of link shafts for journaling the pivotally-mounted portions of the X-shaped links as well as prevents the torsion bar from being projected. For these reasons, the whole seat suspension device can be reduced in thickness.

It is still another object of the invention to provide a seat suspension device which is simple in structure, requires a small number of parts and is inexpensive in costs.

In order to accomplish this object, according to the invention, the torsion bar is arranged so that the central portion thereof supports the two X-shaped links in a journal manner and the two ends thereof are respectively engaged with the two X-shaped links or both frames, whereby the upper frame can be resiliently supported relative to the lower frame.

The above and other related objects and features of the invention will be apparent from a reading of the following description of the disclosure found in the accompanying drawings and the novelty thereof pointed out in the appended claims.

DETAILED DESCRIPTION OF PREFERRED EMBODIMENTS OF THE INVENTION

Figure 1:
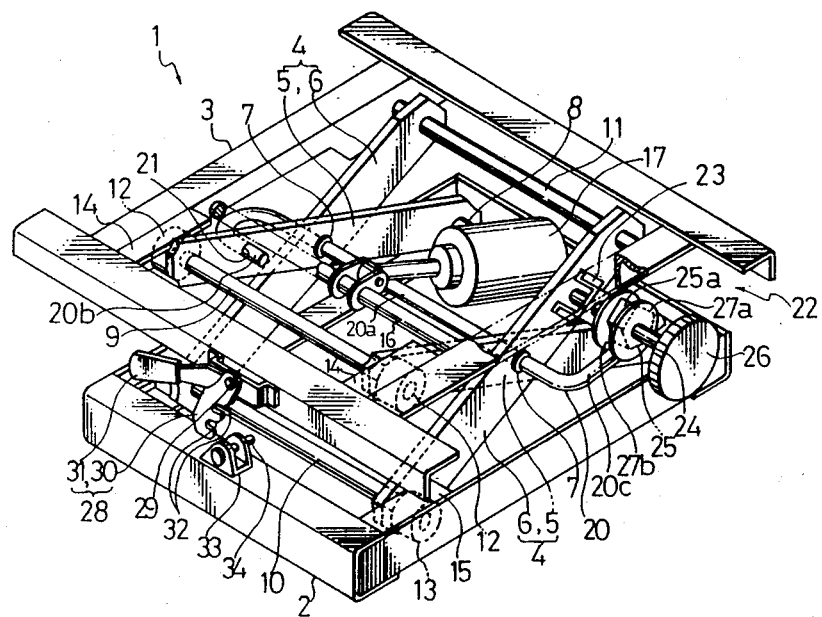
FIG. 1 is a partially cutaway perspective view of a first embodiment of the invention.

Referring first to FIGS. 1 through 4, there is illustrated a first embodiment according to the present invention, in which reference numeral (1) designates an entire seat suspension device of the invention, (2), (3) represent a lower frame and an upper frame, respectively. The lower frame (2) is mounted to side of a vehicle floor, for example, it may be mounted directly to the vehicle floor or to slide rails fixed to the vehicle floor. The upper frame, to which a seat cushion of a seat is attached, is supported in such a manner that it can be moved in the vertical direction through a pair of right and left X-shaped links (4) relative to the lower frame (2).

In other words, each of the two X-shaped links (4) comprises a first link member (5) and a second link member (6) which are intersecting each other and also are pivotally mounted in the respective central portions thereof to each other by means of a bush (7) with flange, with the flange being located therebetween. The rear ends of the first link members (5) of the X-shaped links (4) are connected with each other by means of a rear shaft (8), while the front ends thereof are connected with each other by a front shaft (9). Also, the front ends of the second links (6) are connected with each other by another front shaft (10), while the rear ends thereof are connected with each other by another rear shaft (11). The ends of the rear shafts (8) and (11) are journalled by the rear end side surfaces of the lower frame (2) and upper frame (2), respectively. Also, the ends of the two front shafts (9) and (10) mounts rollers (12) and (13) respectively, which rollers are inserted into rails (14) and (15) opposingly fixed to the front end side surfaces of the upper and lower frames (3) and (2) in such a manner that the rollers can be rolled in the longitudinal direction of the suspension device.

Also, there is provided a rod (16) which extends between the two side surfaces of the upper frame (3). Between the rod (16) and the rear shaft (8) journaled to the rear ends of the lower frame (2), there is mounted a shock absorber (17).

And, between the pivotally-mounted portions of the two X-shaped links (4) there is journaled a torsion bar (20), which torsion bar (20) is rotationally biasing the X-shaped links (4) in the stand-up direction thereof. That is, the torsion bar (20) is journaled by the two X-shaped links (4) in the central portion (20a) thereof in a manner to extend through the bushes (7); one end portion (20b) of the torsion bar (20) is bent formed in a U-shaped configuration and is engaged into an engagement bore (21) formed in the front half section of the first link member (5) of one of the X-shaped links (4); and, the other end portion (20c) is bent in an L-shaped form in a direction opposing to the bending direction of the one end portion (20b) and is engaged via an adjustment mechanism (22) with the rear half section of the second link member (6) of the other X-shaped link (4). The above-mentioned two end portions (20b) and (20c) are respectively engaged in a manner that they are given torsional forces.

The above-mentioned adjustment mechanism (22) comprises a convex-shaped bracket (23) fixedly mounted to the outside surface of the rear half section of the second link member (6), an operation shaft (24) journaled by the bracket (23) and the link member (6) in such a manner to extend through two shaft bores respectively formed in the top surface portion of the bracket (23) and the link member (6) corresponding to each other, a cam member (25) mounted in the intermediate portion of the operation shaft (24), and a handle (26) attached to the outer end of the operation shaft (24).

The above-mentioned cam member (25) of the adjustment mechanism (22) comprises a plurality of cam surfaces (25a) respectively having distances from the journaled portion thereof varying stepwise from one another. Two flange disc plates (27a) and (27b) are opposingly fixed to the two side surfaces of the cam member (25), respectively, and the other end portion (20c) of the torsion bar (20) is abutted against and engaged with the cam surface (25a) between the two disc plates (27a) and (27b).

Figure 2:
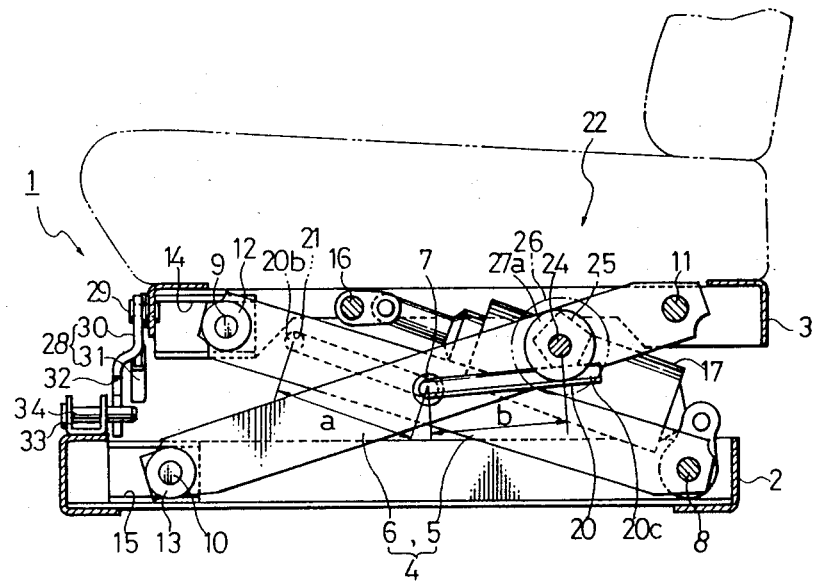
FIG. 2 is a side view of the first embodiment shown in FIG. 1.
Figure 3:
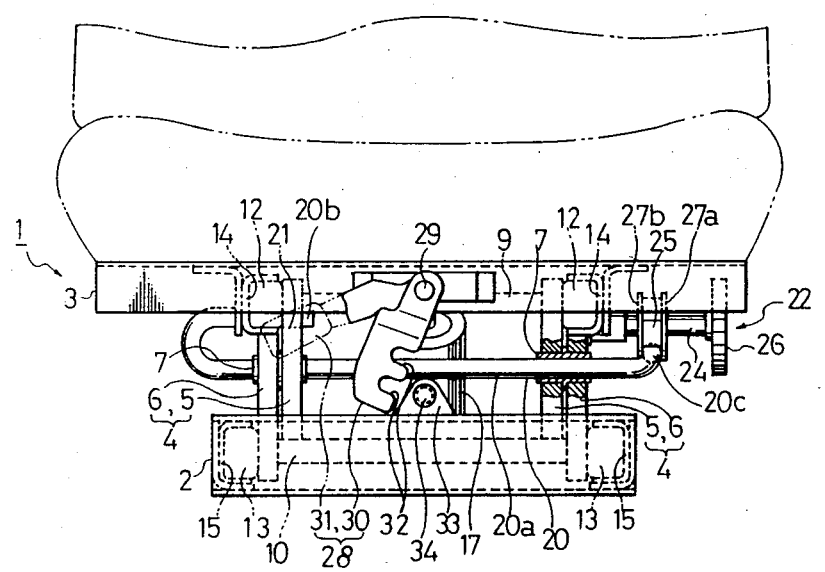
FIG. 3 is a front view of the first embodiment shown in FIG. 1.
Figure 4:
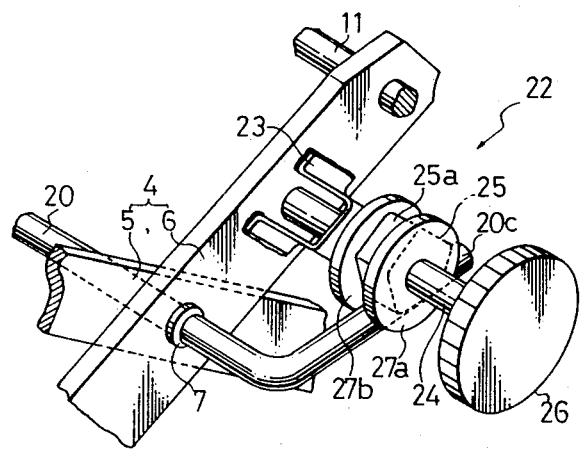
FIG. 4 is an expanded perspective view of an adjustment mechanism employed in the first embodiment of the invention.

In the engagement of the two end portions (20b), (20c) of the torsion bar (20) with the X-shaped link (4), as shown in FIG. 2, the distances from the respective engagement portions to the journaled portion of the torsion bar (20) are set equal to each other. Therefore, a resiliently biasing force can be applied by the torsion bar (20) equally to the two link members (5) and (6) of the X-shaped link (4).

Also, to the central portion of the front side face of the upper frame (3) is journaled a lock member (28) by a pin (29) such that it can be rotated laterally. The lock member (28) comprises a lock piece (30) and a lever (31) which can be rotated integrally with the lock piece (30), and the lock piece (30) is formed in the longitudinal direction thereof with a plurality of notched engagement grooves (32) spaced at given intervals.

Correspondingly to the lock member (28), a bracket (33) is fixedly secured to the upper surface of the front side portion of the lower frame (2), which bracket (33) is provided with an engagement pin (34) to be engaged with the notched engagement groove (32) of the lock piece (30).

In the seat suspension device (1) constructed in the above-mentioned manner, the X-shaped links (4) are biased resiliently by the torsion bar (20) in the standing-up direction thereof. Then, when an occupant is seated on the seat, then the load given by the occupant's sitting rotates the X-shaped links (4) in the falling-down direction thereof, causing the rollers (12) and (13) to slide within the rails (14) and (15), respectively. As a result of this, while the upper frame (3) is lowered down as it is maintained parallel to the lower frame (2), the two end portions (20b) and (20c) of the torsion bar (20) are respectively twisted in the directions opposing to each other to produce a resilient force which can be utilized to perform a suspension operation.

In such suspension operation, the resiliently biasing force is caused to act evenly on the two link members (5), (6) of each of the X-shaped links (4), so that the X-shaped links (4) can be operated more smoothly.

When an occupant of different weight is seated on the seat, the operation shaft (24) can be rotatively operated by the handle (26) to displace the cam surfaces (25a) of the cam member (25) stepwise and thus vary the torsional angle of the torsion bar (20), with the result that the intensity of the resiliency force of the torsion bar (20) can be adjusted. That is, the upper frame (3), namely, the seat can be always held in a support height according to the weights of the occupants.

Also, when the above-mentioned suspension operation is not necessary, the lock piece (30) of the lock member (28) can be rotated by means of the lever (31) to bring one of the notched engagement grooves (32) into engagement with the lock pin (34). As a result of this, the upper frame (3) is locked immovable in the vertical direction relative to the lower frame (2), so that the suspension operation is caused to stop.

In the above-mentioned locking of the upper frame (3), by bringing the adjacent notched engagement grooves (32) of the lock piece (31) into engagement with the lock pin (34) sequentially, the fixed height of the upper frame (3) or the seat can be adjusted in steps.

Figure 6:
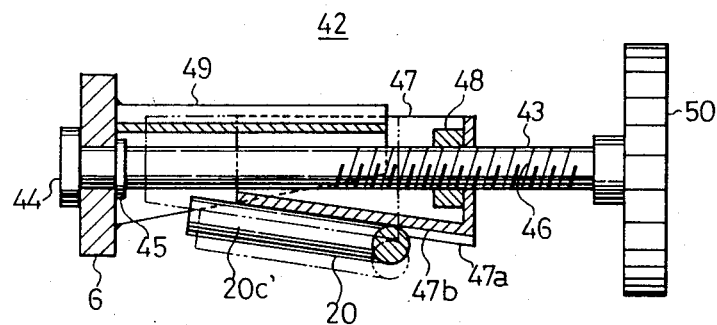
FIG. 6 is a section view taken along the line VI—VI in FIG. 5.
Figure 7:
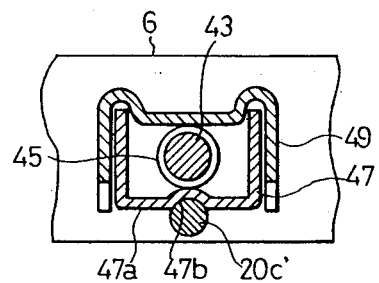
FIG. 7 is a section view taken along the line VII—VII in FIG. 5.

Although in the foregoing arrangement the adjustment mechanism has been illustrated as employing the cam member, next another embodiment, that is, an adjustment mechanism (42) will be explained below in connection with FIGS. 5 through 7.

In the above-mentioned adjustment mechanism (42), an operation shaft (43) is journaled to the outer side face of the rear half section of the second link (6) of the X-shaped link (4) by means of a flange (44) provided at the inner end of the operational shaft (43) and a retaining ring (45) fitted over the operation shaft (43) on the outer side face of the link member (6) in such a manner that it can be rotated in the peripheral direction thereof but is prevented against movement in the axial direction thereof; a slide bracket (47) is threadedly engaged with a threaded groove portion (46) formed in the outer half section of the operation shaft (43) by means of a nut (48) fixed to the inside surface of the outer side face portion the bracket (47) in alignment with the shaft bore of the bracket (47); a guide bracket (49), which is formed so as to embrace the slide bracket (47) from the upper portion thereof over to the two side portions thereof, is fixed to the outer surface of the link member (6); and, a handle is fixedly attached to the outer end of the above-mentioned operation shaft (43).

The slide bracket (47) of the above-mentioned adjustment mechanism (42) includes a lower surface portion (47a) which is formed so as to slope downwardly from the inside thereof to the outside thereof, and, centrally of the lower surface portion (47a) there is formed a recessed groove (47b) of an arc-like section which extends inwardly and outwardly, whereby the operation shaft (43) can be slided inwardly or outwardly along the guide bracket (49) by rotationally operating the handle (50) attached to the outer end of the operation shaft (43).

Also, in this embodiment, the other end (20c) of the torsion bar (20) is further bent and extended in the inward direction of the adjustment mechanism (42) to provide an extension portion (20c'), which extension portion (20c') is then is abutted against the recessed groove (47b) of the sloped lower surface (47a) of the slide bracket (47) so as to be engageable therewith.

When the operation shaft (43) is rotated by means of the handle, then the bracket (47) is slided inwardly or outwardly to displace the sloped lower surface (47a) thereof. With the displacements of the sloped lower surface (47a) due to such sliding motion, the torsion angle of the torsion bar (20) is successively varied to adjust the strength of the resiliency of the torsion bar (20).

According to the above-mentioned adjustment mechanism (42), the torsional angle of the torsion bar (20) can be adjusted in a stepless way and thus the support height of the seat can be adjusted accurately according to the weight of the then occupant irrespective of the occupant's weight.

In the above-mentioned embodiment, although the link members (5) and (6) of the X-shaped link (4) are pivotally connected to each other via the bush (7), when there is no possibility that the shaft bores of the two link members (5) and (6) may wear out because they have been machined wear-proof, or when the link members are respectively formed of a wear resisting material, the bush (7) may be omitted and the two link members (5), (6) may be pivotally connected to each other by the torsion bar (20) directly.

Also, in the above-mentioned embodiment, the engagement portions of the two end portions (20b) and (20c) of the torsion bar (20) with the X-shaped link (4) are set equidistant each other from the journaled portion of the torsion bar (20), but the invention is not limited to this. For example, the engagement portion of the other end portions (20c) of the torsion bar (20), that is, the adjustment mechanism (22) or (42) may be located in another place spaced further from the journaled portion of the torsion bar. In this case, a point of force is set at a further position, so that the handle (25) or (50) can be operated with a lighter force.

As has been described hereinbefore, the seat suspension device of the invention uses the torsion bar as resilient means, which permits reduction of the weight thereof over the conventional devices employing coil springs. Also, according to the invention, since the torsion bar is journaled to the respective pivotally connected portions of the X-shaped links so as to be able to serve as the shaft of the links, the lower and upper frames thereof can be reduced in thickness and thus the whole seat suspension device can be also produced in a thinner form. Further, since the seat suspension device of the invention is very simple in structure, it requires a smaller number of parts and is reduced in cost. That is, the present invention provides various practical effects.

Figure 8:
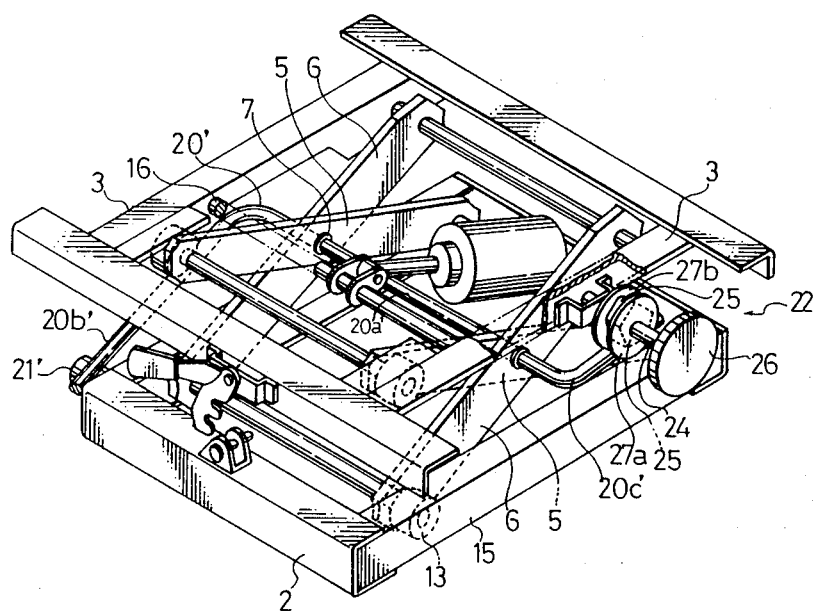
FIG. 8 is a partially cutaway perspective view of a second embodiment of the invention.
Figure 9:
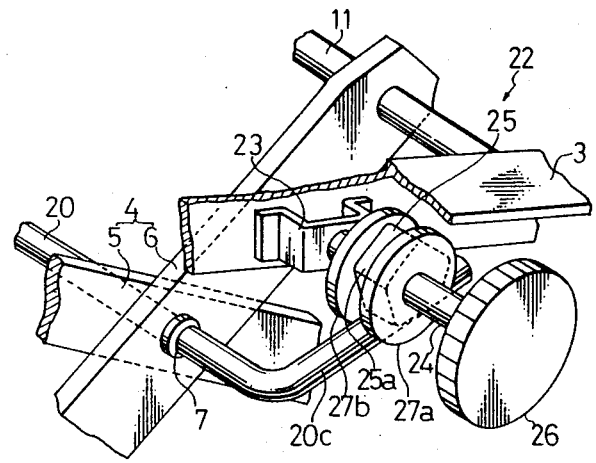
FIG. 9 is an expanded perspective view of an adjustment mechanism employed in the second embodiment shown in FIG. 8; and, FIG. 10 is an expanded perspective view of another embodiment of the adjustment mechanism shown in FIG. 9.

Referring now to FIGS. 8 and 9, there is shown a second embodiment of the invention. In these figures, the same references as in FIGS. 1 through 7 designate the same parts thereof respectively and the explanations thereof are omitted here. In other words, the second embodiment is similar to the above-described first embodiment of the invention in that a torsion bar (20') is journaled in the central portion (20a') thereof to the two X-shaped links (4) in a manner to extend therethrough via the bushes (7), but it differs from the first embodiment in that one end portion (20b') of the torsion bar (20') is bent forwardly in an L-shaped form and is abutted against and engaged with a tubular receiving metal fitting (21') mounted to the front portion of a first outer side surface of the lower frame (2), while the other end portion (20c') thereof is backwardly bent in an L-shaped form and is abutted against and engaged with the adjustment mechanism (22) as receiving means mounted in the rear half section of a second outer surface of the upper frame (3), thereby providing a torsional force.

This adjustment mechanism (22) is identical with that employed in the first embodiment and thus the explanation thereof is not given here again.

Figure 5:
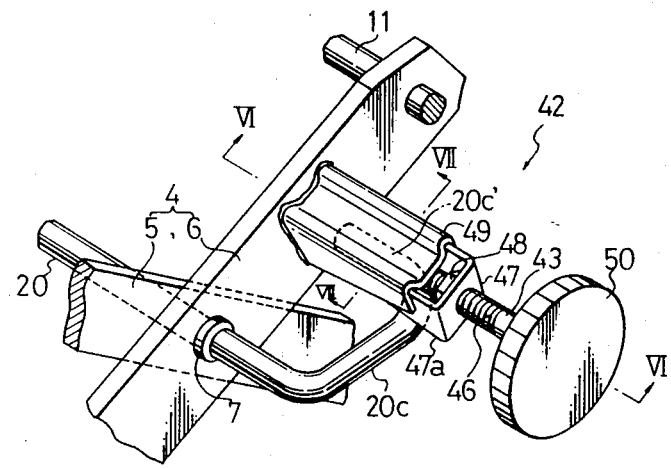
FIG. 5 is an expanded perspective view of another embodiment of the adjustment mechanism employed in the invention.
Figure 10:
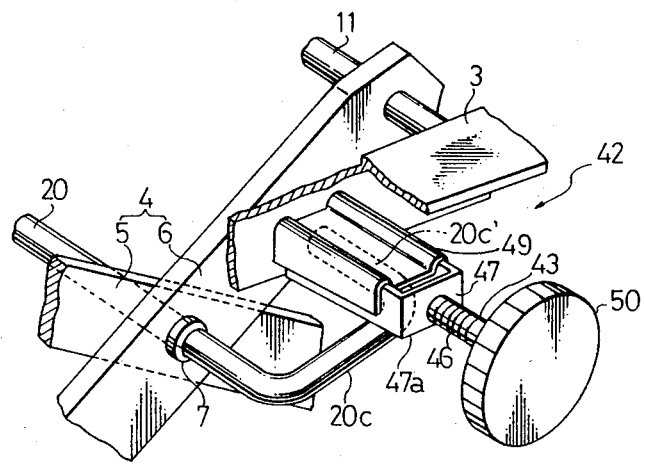

Referring finally to FIG. 10, there is shown another embodiment of the invention in which an adjustment mechanism identical with the adjustment mechanism (42) in FIG. 5 is mounted to the upper frame (3) so as to be able to adjust the resilient force of the torsion bar.

In this embodiment, the two ends of the torsion bar are engaged with the lower or upper frame to provide no obstacle to the rising and falling oeration of the X-shaped links, whereby the upper frame can be lowered enough relative to the lower frame. Therefore, this embodiment is greatly effective when it is applied to a passenger car which is provided with a seat of lower height.

What is claimed is:
1. A seat suspension device comprising:
 a lower frame to be mounted on the floor of a vehicle;
 an upper frame for mounting a seat thereto;
 a pair of pivotally connected, X-shaped links respectively disposed on opposite sides of, between said upper and lower frames, and supporting said upper frame in a manner such that the upper frame is moveable in a vertical direction relative to said lower frame, and
 a torsion bar journaled to the point of pivotal connection connecting the link members of said X-shaped links, said torsion bar comprising a center portion having a terminal portion at each end thereof, each of said terminal portions being disposed at substantially right angles to said center portion, and being disposed in substantially opposing directions with respect to each other, wherein one of said terminal portions is engaged with a link member of one of said pair of X-shaped links, while the other said terminal portion is engaged with a link member of the other of said X-shaped links, or wherein one of said terminal portions is engaged with one side of one of said frames, while the other terminal portion is engaged with the other side of the other of said frames, said torsion bar being adapted to resiliently support said upper frame relative to said lower frame.

2. The seat suspension device of claim 1 wherein said torsion bar is journaled in the central portion of said X-shaped links, and wherein a first terminal portion of said torsion bar is bent in a U-shaped form and is inserted into an engagement bore formed in the front half section of a link member of one of said X-shaped links, and a second terminal portion of said torsion bar is bent in an L-shaped form in a direction substantially opposed to said first terminal portion, said second terminal portion being engaged by means of an adjustment mechanism with the rear half section of a link member of the other of said X-shaped links.

3. The seat suspension device of claim 1, wherein a first terminal portion of said torsion bar is bent forwardly in an L-shaped form, and is abutted against a receiving metal fitting mounted on the front portion of a first outer side surface of said lower frame, while a second terminal portion of said torsion bar is bent in an L-shaped form in a direction substantially opposite to said first terminal portion, and is abutted against said adjustment mechanism mounted to a second outer side surface of a rear half section of said upper frame.

4. The seat suspension device as claimed in claim 2, wherein said seat adjustment mechanism comprises handle operated slide means against which said second terminal portion of said torsion bar is operably abutted, whereby when said handle is operated, then said slide means operates to adjust the resilient force produced by said torsion bar.

5. The seat suspension device as claimed in claim 3, wherein said adjustment mechanism comprises handle operated slide means against which said second terminal portion of said torsion bar is operably abutted, whereby when said handle is operated, then said slide means operates to adjust the resilient force produced by said torsion bar.

6. The seat suspension device as claimed in claim 1, wherein said adjustment mechanism comprises a rotatable cam means fixed to a handle whereby said handle can be rotated to turn said cam means so as to adjust the resilient force of said torsion bar.

7. A seat suspension device comprising:

a lower frame to be mounted on the floor side of a vehicle;

an upper frame for mounting a seat thereto;

a pair of X-shaped links respectively disposed right and left between said lower and upper frames to support said upper frame in a manner that said upper frame is moveable in a vertical direction; and, a torsion bar journaled to the pivotally-connected portions of said right and left X-shaped links to resiliently support said upper frame relative to said lower frame;

wherein said torsion bar includes two end portions respectively bent, and one of said end portions engaged with a first link member of one of said X-shaped links and the other end portion is engaged with a second link member of the other X-shaped link so as to energize said right and left X-shaped links in the respective stand-up direction thereof, and wherein said torsion bar journals said right and left X-shaped links in the central portion thereof, and wherein said one end portion of said torsion bar is bent in a U-shaped form and is inserted into an engagement bore formed in the front half section of said first link member of said one shaped link, and said the other end portion is bent in an L-shaped form in a direction opposite to said one end portion and is engaged via an adjustment mechanism with the rear half section of said second link member of said other X-shaped link, and wherein further, said adjustment mechanism comprises an operation shaft with a threaded portion moveable in the peripheral direction thereof but immoveable axially, a slide bracket threadedly engaged with said threaded portion of said operation shaft and formed in a sloping shape, and a handle fixed to the end of said operation shaft, while said the other end portion of said torsion bar is abutted against said sloped surface of said slide bracket, whereby when said handle is rotationally operated, then said slide bracket can be moved to adjust the resilient force of said torsion bar.

* * * * *